Patented Mar. 20, 1928.

1,663,474

UNITED STATES PATENT OFFICE.

FRANZ ACKERMANN, OF BINNINGEN, NEAR BASEL, SWITZERLAND, ASSIGNOR TO SOCIETY OF CHEMICAL INDUSTRY IN BASLE, OF BASEL, SWITZERLAND.

VAT DYESTUFFS OF THE ANTHRAQUINONE SERIES CONTAINING THE TRIAZINE RING AND PROCESS OF MAKING SAME.

No Drawing. Application filed September 24, 1927, Serial No. 221,858, and in Switzerland October 6, 1926.

The present invention relates to new vat dyestuffs of the anthraquinone series containing the triazine ring. It comprises the new dyestuffs, the process of making same, their application, and the material which has been dyed with the new dyestuffs.

In the United States patent specifications Nos. 1,437,783, 1,523,308, 1,568,627, and in the patent application Serial No. 31,202, filed May 18th, 1925, there are described vat dyestuffs of the anthraquinone series which are characterized by the presence of one or more triazine rings:

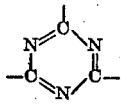

in their molecule. These dyestuffs are distinguished by the remarkable fastness properties of their dyeings on cotton.

The surprising observation has now been made that these dyestuffs, when treated with aqueous hypochlorite solutions, may be transformed into products dyeing considerably more pure and at the same time faster shades. This is most probably due to the fact that by such treatment the dyestuffs are freed from impurities not hitherto removable by other methods. The result of the new process is surprising, as it could not be foreseen that dyestuffs such as are here in question, which contain one or more NH-groups, would stand a treatment with hypochlorites.

The dyestuffs thus obtained, in case they still contain mobile halogen atoms in the triazine ring, may, of course, be further condensed with compounds containing primary amino-groups, such as aniline, ammonia, or also with compounds such as water, alcohol, phenol, and the like.

The following examples illustrate the invention, the parts being by weight:—

*Example 1.*

50 parts of the crude condensation product from 2 molecular proportions of 1-amino-anthraquinone and 1 molecular proportion of cyanuric chloride, of the probable formula:—

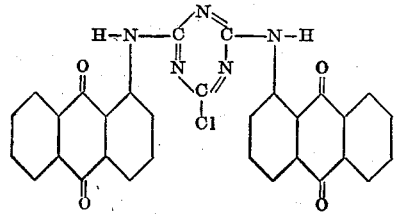

are suspended in 100 parts of water, and the suspension is treated for a long time at 40–50° C. with 400 parts of sodium hypochlorite solution containing 8 per cent of active chlorine. The dyestuff is then filtered from the liquid and dried.

The dyestuff thus purified dyes cotton yellow tints which are considerably more pure than those obtained with the original dyestuff and of enhanced fastness to chlorine.

By conversion of the new product with aniline a dyestuff is obtained dyeing a considerably redder tint.

By treating the vat dyestuffs from 1 molecular proportion of cyanuric chloride, 2 molecular proportions of β-aminoanthraquinone and 1 molecular proportion of aniline in a similar manner with hypochlorite a product dyeing considerably more pure and greener shades is obtained.

*Example 2.*

20 parts of the crude condensation product from 1 molecular proportion of 1-amino-4-methoxyanthraquinone, 1 molecular proportion of 1-amino-anthraquinone and 1 molecular proportion of cyanuric chloride are thoroughly dispersed in 400 parts of a sodium hypochlorite solution containing 8 per cent of active chlorine, and the mixture is stirred for some time at 70–75° C. The dyestuff, separated by filtration, dyes cotton a vivid orange, whereas the crude product dyes cotton brown.

*Example 3.*

50 parts of the crude condensation product from 1 molecular proportion of 1:8-diaminoanthraquinone, 2 molecular proportions of cyanuric chloride, 3 molecular proportions of 1-aminoanthroquinone and 1 molucular proportion of ammonia, of the probable formula:—

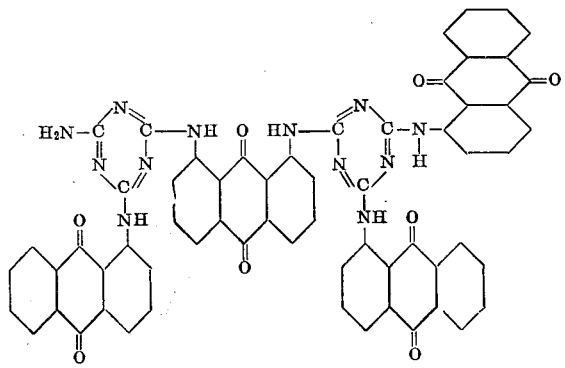

are brought into a finely subdivided state by dissolution in concentrated sulphuric acid and pouring this solution upon ice. The filtered paste is washed until neutral and treated at 80–90° C. for some time with 500 parts of a solution of sodium hypochlorite containing 8 per cent of active chlorine. The dyestuff is separated by filtration, washed and dried. The purified dystuff dyes cotton a vivid orange faster than the yellow brown dyeing of the crude product.

Similarly behave those dystuffs in which 1:8-diaminoanthraquinone is replaced by mixtures of 1:8- and 1:5-diaminoanthraquinone, or mixtures of 1:8-, and 1:5- and other diaminoanthraquinones (such as are formed by reducing the technical dinitration mixtures of anthraquinone). In this case the treatment with hypochlorite may also precede the condensation with ammonia.

*Example 4.*

100 parts of the condensation product from 1 molecular proportion of 1:4-diaminoanthraquinone, 2 molecular proportions of cyanuric chloride, 1 molecular proportion of monobenzoyl-1:4-diaminoanthraquinone, 2 molecular proportions of 1-aminoanthraquinone and 1 molecular proportion of ammonia, of the probable formula:—

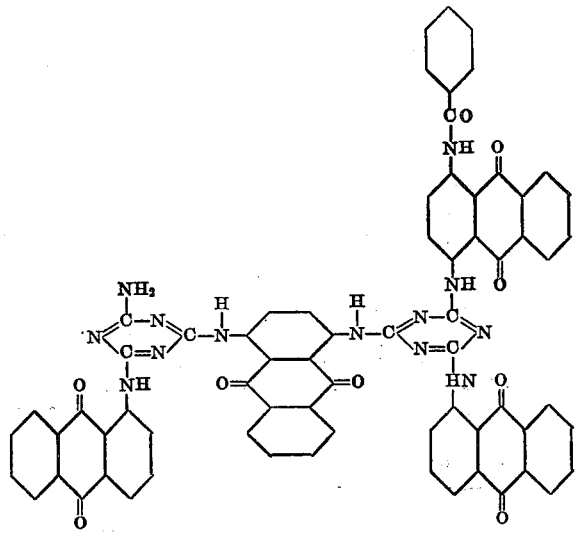

are stirred for one hour at 70 to 80° C. and for one hour at 80 to 90° C. with 100 parts of sodium hypochlorite solution containing 8 per cent by weight of active chlorine. The dystuff is separated by filtration, washed and dried. The dyestuff thus obtained dyes cotton brick-red and considerably more vivid and faster to chlorine and light than the product not treated in this manner.

*Example 5.*

The treatment with hypochlorite may, in certain cases, occur in presence of an organic liquid which is not miscible with water. For instance, 12 parts (1 mol.) of a technical mixture of 1:8-and 1:5-diaminoanthraquinone is condensed in known manner with 18.5 parts (2 mol.) of cyanuric chloride, 25 parts (somewhat more than 2 mol.) of 1-aminoanthraquinone and 17 parts (1 mol.) of 1-benzoylamino-4-aminoanthraquinone in presence of 600 parts of nitrobenzene, and there are added to the mass 50 parts of water, and, after addition of some alkali and at a temperature of 90° C. 100 parts of a solution of sodium hypochlorite containing 8 per cent of active chlorine, drop by drop, by blowing off nitrobenzene and filtering the residue there is obtained a product which dyes orange brown. If the treatment with hypochlorite be omitted there will be obtained a considerably duller product. Instead of sodium hypochlorite another hypochlorite, such as that of calcium or potassium, may be used.

What I claim is:—

1. A process for the manufacture of vat dystuffs of the anthraquinone series consisting in treating vat dyestuffs of the anthraquinone series containing triazine rings with aqueous hypochlorite solutions.

2. A process for the manufacture of vat dyestuffs of the anthraquinone series consisting in treating vat dystuffs of the anthraquinone series containing triazine rings with aqueous hypochlorite solutions, and then further condensing the products thus obtained with such compounds which contain a primary aminogroup.

3. As new products the new vat dyestuffs of the anthraquinone series containing triazine rings which are obtained by treating such dyestuffs with hypochlorite solutions, the resulting dyestuffs being distinguished from the dyestuffs not so treated by the purity and the increased fastness properties of their dyeings.

In witness whereof I have hereunto signed my name this 15th day of September 1927.

FRANZ ACKERMANN.